US006949602B2

(12) United States Patent
Gosiewski et al.

(10) Patent No.: US 6,949,602 B2
(45) Date of Patent: Sep. 27, 2005

(54) HEAT RESISTANT, IMPACT RESISTANT, ACRYLIC/EPOXY ADHESIVES

(75) Inventors: Donald E. Gosiewski, Peabody, MA (US); Brian Rice, Perkiomenville, PA (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/326,300

(22) Filed: Dec. 19, 2002

(65) Prior Publication Data

US 2004/0118514 A1 Jun. 24, 2004

(51) Int. Cl.[7] .............................................. C08L 51/00
(52) U.S. Cl. ..................................... 525/65; 156/330
(58) Field of Search ............................. 525/65; 156/330

(56) References Cited

U.S. PATENT DOCUMENTS

| | | | |
|---|---|---|---|
| 3,890,407 A | 6/1975 | Briggs, Jr. et al. | |
| 4,112,013 A | 9/1978 | Briggs, Jr. et al. | |
| 4,113,792 A | 9/1978 | Pastor et al. | |
| 4,182,644 A | 1/1980 | Briggs, Jr. et al. | |
| 4,287,106 A | * 9/1981 | Forgo et al. | ................. 524/500 |
| 4,426,243 A | 1/1984 | Briggs | |
| 4,536,546 A | 8/1985 | Briggs | |
| 4,612,209 A | 9/1986 | Forgo et al. | |
| 4,695,508 A | 9/1987 | Kageyama et al. | |
| 4,714,730 A | 12/1987 | Briggs et al. | |
| 4,773,957 A | 9/1988 | Briggs | |
| 4,942,201 A | 7/1990 | Briggs et al. | |
| 4,959,405 A | * 9/1990 | Briggs et al. | ................ 524/321 |
| 5,112,691 A | 5/1992 | Briggs et al. | |
| 6,660,805 B1 | * 12/2003 | Righettini et al. | ............. 525/65 |

FOREIGN PATENT DOCUMENTS

| | | |
|---|---|---|
| EP | 0 218 365 | 4/1987 |
| WO | WO 97/00923 | 1/1997 |

OTHER PUBLICATIONS

EPO Search Report, dated Apr. 28, 2004.

* cited by examiner

*Primary Examiner*—Randy Gulakowski
*Assistant Examiner*—Christopher Keehan
(74) *Attorney, Agent, or Firm*—Gardere Wynne Sewell LLP

(57) ABSTRACT

A heat and impact resistant adhesive is disclosed. The adhesive can include at least one acrylic-based monomer, at least epoxy based monomer/resin, at least one bifunctional monomer chemically reactive with the acrylic-based monomer and the epoxy based monomer/resin, at least one impact modifier, and a catalyst system.

24 Claims, No Drawings

HEAT RESISTANT, IMPACT RESISTANT, ACRYLIC/EPOXY ADHESIVES

TECHNICAL FIELD OF THE INVENTION

The present invention relates generally to the field of adhesives, and more particularly, to acrylic/epoxy adhesives that are heat and impact resistant and have increased adhesive bonding capabilities.

BACKGROUND OF THE INVENTION

Without limiting the scope of the invention, its background is described in connection with characteristics of various adhesives.

Acrylic-based adhesives have been used in applications that require compositions exhibiting fast curing and flexible adhesive qualities. While acrylic-based adhesives are generally good for causing adhesion to difficult substrates such as plastics, they often have undesirable heat resistance. Curable epoxy resins have also been used as adhesive compositions. Epoxy adhesives form a tight polymer network and generally exhibit desirable thermal properties. Epoxy adhesives, however, tend not to bond to plastics well and tend to be brittle and exhibit poor impact strength. Generally, epoxies are slow curing which renders them inappropriate for many industrial applications.

Many adhesives exhibit poor physical properties such as decreased impact strength, poor adhesive bonding capabilities, and setting times, depending on the application. Adding impact modifiers and other copolymers to the adhesive may improve these physical characteristics. Unfortunately, while impact modifiers tend to improve some physical properties, they typically exhibit poor heat resistance. With the use of more and more plastics in industrial applications such as for example, automobile assembly, there is a continuing need for adhesives that can be used on plastics as well as metals to form adhesive bonds that will hold up under a wide variety of adverse conditions.

SUMMARY OF THE INVENTION

There is a need for a novel, quick setting, room temperature curable adhesive which combines the room temperature curing and quick setting features of acrylic-based adhesives with the heat resistant qualities of epoxy resin-based adhesives. Also, an adhesive is needed which is heat and impact resistant and can bond difficult substrates.

One embodiment of the present invention is a heat and impact resistant adhesive. The adhesive includes at least one acrylic-based monomer, at least one epoxy based monomer/resin, at least one bifunctional monomer chemically reactive with the acrylic-based monomer and the epoxy based monomer/resin, at least one impact modifier, and a catalyst system. Adhesives of the present invention also may contain at least one elastomer.

Another embodiment of the present invention is a method for making an adhesive. The method includes the steps of contacting a mixture with an activator, wherein the mixture contains at least one acrylic-based monomer, at least one epoxy based monomer/resin, at least one bifunctional molecule reactable with the acrylic-based monomer and the epoxy based monomer/resin, at least one impact modifier, and a catalyst system.

Another embodiment of the present invention is a method for bonding two surfaces. The method includes the steps of mixing at least one acrylic-based monomer, at least one epoxy based monomer/resin, at least one bifunctional molecule reactable with the acrylic-based monomer and the epoxy based monomer/resin, at least one impact modifier, and a catalyst system to form a mixture; applying the mixture to a first surface; applying an activator to a second surface; and contacting the first surface with the second surface.

Another embodiment of the present invention is a method for bonding two surfaces. The method includes the steps of mixing at least one acrylic-based monomer, at least one epoxy based monomer/resin, at least one bifunctional molecule reactable with the acrylic-based monomer and the epoxy based monomer/resin, at least one impact modifier, a catalyst system and an activator; applying the mixture to a first surface or a second surface; and contacting the first surface with the second surface.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention, and are not meant to limit the scope of the invention.

Adhesives of the present invention have improved adhesive bonding capabilities as well as improved impact resistance and heat resistance. Adhesives of the present invention contain acrylic-based monomers and epoxy based monomer/resins that are polymerized using an acrylic/epoxy polymerization curing system. The present inventors have discovered that using a polymerization system that utilizes both an acrylic-based curing system and an epoxy-based curing system results in an improved adhesive. Adhesives of the present invention also include impact modifiers that improve impact strength, adhesion, and handling properties, and also include elastomers that improve flexibility and adhesion.

Monomers

As used herein, the term acrylic-based monomer or acrylic-based adhesive component is used generically and generally refers to compounds exhibiting the chemical structure:

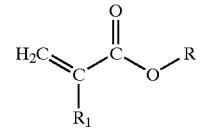

Where $R_1$, for example, can be hydrogen, a methyl group or an ethyl group. "Acrylic-based" is defined to encompass both acids and salts of acids. For example, acrylic-based compounds may include acrylic acid and acrylates. Acrylic-based compounds may include acrylate-based, and methacrylate based compounds. The terms acrylic-, acrylate-, and methacrylate-based, are simply a convenient means for labeling where functional groups are located on an adhesive component and are used interchangeably. Using the structure above as an example, when R and $R_1$ are both hydrogen, the acrylic-based adhesive component is known as acrylic acid (an organic acid). When R is hydrogen, and when $R_1$ is a methyl group, the acrylic-based adhesive component is known as methacrylic acid. When R is a methyl group, and $R_1$ is hydrogen, the acrylic-based adhesive component is known as methyl acrylate, and the acrylic-based adhesive component is said to be acrylate-based. Acrylate-based components generally exhibit the chemical structure ($H_2C$=CH—COO—). When R and $R_1$ are both methyl groups, the acrylic-based adhesive component is known as methyl methacrylate (MMA), and is said to be methacrylate-based. Methacrylate-based components generally exhibit the chemical structure ($H_2C$=CCH$_3$COO—).

Acrylic-based monomers useful in the present invention include, but are not limited to, acrylate-based, and methacrylate-based monomers. Acrylate-based monomers include acrylate esters wherein the alcohol portion of the ester contains from about one to about twenty carbon atoms. Examples of which include, but are not limited to, methyl acrylate, ethyl acrylate, butyl acrylate, 2-ethylhexyl acrylate, and the like and mixtures thereof. Methacrylate-based monomers include methacrylate ester monomers wherein the alcohol portion of the ester group contains from about one to about twenty carbon atoms. Examples of such ester monomers include, but are not limited to, methyl methacrylate, ethyl methacrylate, 2-ethylhexyl methacrylate, cyclohexyl methacrylate, ethoxylated bisphenol A dimethacrylate, and the like and mixtures thereof. Butyl methacrylate and tetra hydrofurfuryl methacrylate can also be used. Other useful monomers include acrylonitrile, methacrylonitrile, styrene, vinyl toluene, and the like. In one embodiment of the present invention, the acrylic-based monomer is MMA or methyl methacrylate.

Adhesives of the present invention contain acrylic-based monomers present in an amount sufficient to form adhesives that are impact and heat resistant and have increased adhesive bonding capabilities. In one embodiment of the present invention, acrylic-based monomers are present in an amount in the range of from about 30 to about 60 weight percent, based on the weight of the adhesive. In another embodiment of the present invention, acrylic-based monomers are present in an amount in the range of from about 40 to about 55 weight percent, based on the weight of the adhesive. In another embodiment of the present invention, acrylic-based monomers are present in an amount in the range of from about 45 to about 55 weight percent of the adhesive.

As used herein, "epoxide based monomer" or "epoxide" or "epoxide resin" or "epoxy" or "epoxy based monomer/resin" are used interchangeably and refer to compounds containing a three-member "epoxide" group or ring, as shown below, as an integral part of the chemical structure.

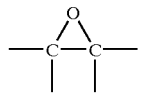

Epoxy based monomer/resins useful in the present invention include, but are not limited to, diglycidyl ethers of bisphenol A and F, and aliphatic and cycloaliphatic epoxies. Other examples include, but are not limited to, 3,4-epoxy cyclohexyl methyl-3,4-epoxy cyclohexyl carboxylate (ERL-4221 from Union Carbide), and sorbitol glycidyl ether (Erisys GE-60 from CVC Specialty Chemicals).

Adhesives of the present invention contain epoxy based monomer/resins present in an amount sufficient to form adhesives that are impact and heat resistant and have increased adhesive bonding capabilities. Generally, the epoxy based monomer/resin level may depend, in part, on post cure conditions (e.g., excess heat). In one embodiment of the present invention, epoxy based monomer/resins are present in an amount greater than about 40 weight percent based on the weight of the adhesive. In another embodiment of the present invention, epoxy based monomer/resins are present in an amount in the range of from about 2 to about 40 weight percent based on the weight of the adhesive. In another embodiment of the present invention, epoxy based monomer/resins are present in an amount in the range of from about 3 to about 16 weight percent based on the weight of the adhesive.

Polymerization Systems

It is generally known in the art that polymerization of acrylic-based monomers proceeds by a free radical addition polymerization mechanism. Useful examples of acrylic-based curing systems include, but are not limited to systems using sulfonyl chloride compounds. These systems generally combine sulfonyl chloride compounds with reducing agents, such as dihydropyridine (also known as an amine-aldehyde condensation product) to generate radicals that polymerize the acrylic-based monomer. Curing systems based on sulfonyl chlorides are generally described in U.S. Pat. Nos. 3,890,407; 4,112,013; 4,182,644; 4,536,546; 4,714,730; 4,773,957; and 4,959,405, the entirety of which are incorporated herein by reference.

Other examples of acrylic-based curing systems include systems that use peroxides and toludine reducing agents. These systems generally combine a peroxide, for example, benzoyl peroxide, with a toluidine reducing agent to generate radicals which polymerize the acrylic-based monomer. Curing systems based on peroxide/toluidine systems are described in U.S. Pat. Nos. 4,942,201; 5,112,691; and 5,206,288, the entireties of which are incorporated herein by reference.

Epoxy polymerization generally is the result of various chemicals opening and bonding to the epoxy ring. Typical organic chemicals that may react with epoxies include, but are not limited to, acids, mercaptans, amines and amides. Epoxy rings are usually part of a much larger molecule. For example, the backbone may be an aliphatic organic molecule, a cyclic organic molecule, an aromatic organic molecule, or any combination thereof. When there are two epoxies on one molecule and two reactive groups on the compound being added to the epoxy, the molecular weight grows as the ends react together and a polymer is formed.

Adhesives of the present invention are formed using an acrylic/epoxy polymerization system that utilizes both an acrylic-based curing system and an epoxy-based curing system. The present inventors have found that such an acrylic/epoxy polymerization system may be accomplished by driving the reaction using a "bi-functional" molecule, which has epoxy-based reactive groups and acrylic-based reactive groups on the same molecule. As used herein, a "bi-functional" molecule or monomer refers to a molecule that contains two different chemically reactive functional groups. For example, methacrylic acid contains an acrylic-based functional group and an epoxide reactive group. For purposes of illustrating the present invention, bi-functional molecules include molecules having two functional groups where one functional group is capable of reacting with epoxide groups and another functional group is capable of reacting with acrylic-based functional groups. Examples of bi-functional molecules are included in U.S. Pat. No. 4,426,243, the entirety of which is incorporated herein by reference.

In contrast, a "di-functional" molecule refers to a molecule that contains two identical chemically reactive groups. For example, an ethoxylated bisphenol A dimethacrylate molecule has two methacrylate functional groups. Another example is a bisphenol A diepoxide molecule that has two epoxide functional groups. In the same sense, trimethylolpropane [2-ethyl-2-(hydroxymethyl)-1,3-propanediol] trimethacrylate is an example of a "tri-functional" molecule because it contains three methacrylate functional groups.

A variety of suitable chemical species may be used as the backbone of a bi-functional molecule. For example, bisphenol A, also known as 4,4'-isopropylidenediphenol may be used. The chemical structure of bisphenol A is shown below:

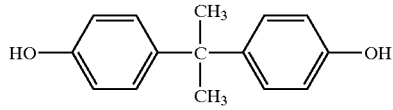

Typical diepoxide-based molecules that may be used in the present invention include diglycidyl ethers of bisphenol A, and a typical diacrylic-based molecule includes ethoxylated bisphenol A dimethacrylate. As is known by those skilled in the art, these two examples of difunctional molecules are structurally similar, but chemically distinct.

Examples of bi-functional molecules useful in the present invention include, but are not limited to, MAA (methacrylic acid), AMPS 2404 (2-acrylamido-2-methyl propanesulfonic acid available from the Lubrizol Corp), P2M (2-Hydroxyethylmethacrylate phosphoric acid partial ester available from Kyoeisha Chemical Co.), and the like and mixtures thereof. Adhesives of the present invention contain bi-functional molecules in an amount sufficient to produce adhesives that are heat and impact resistant and have increased adhesive bonding capabilities. The amount of bifunctional molecule present in adhesives of the present invention generally may vary, depending on various conditions. In one embodiment of the present invention, bi-functional molecules are present in an amount up to about 20 weight percent, based on the weight of the adhesive. In another embodiment of the present invention, bi-functional molecules are present in an amount in the range of from about 2 to about 15 weight percent based on the weight of the adhesive. In another embodiment, bi-functional molecules are present in an amount in the range of from about 2 to about 10 weight percent based on the weight of the adhesive.

The amount of bifunctional molecule present in adhesives of the present invention may affect the concentration of epoxy based monomer/resins present in the adhesive. In one embodiment of the present invention, the bifunctional monomer is present in an amount in the range of from up to about 2 weight percent, based on the weight of the adhesive, and the adhesive has a bifunctional monomer to epoxy based monomer/resin mole ratio in the range of from about 1:1 or greater epoxy based monomer/resin. In another embodiment of the present invention, the bifunctional monomer is present in an amount greater than about 2 weight percent, based on the weight of the adhesive, and the adhesive has a bifunctional monomer to epoxy based monomer/resin mole ratio of about 1:0.3 or greater epoxy.

Bi-functional molecules of the present invention may be used with different combinations of curing systems to produce adhesives of the present invention. For example, according to one embodiment of the present invention, a bi-functional molecule may be used in connection with an acrylic/epoxy cure system based on sulfonyl chloride (acrylic-based monomers) and epoxy polymerization (epoxy based monomer/resins). In another embodiment of the present invention, a bi-functional molecule may be used in connection with an acrylic/epoxy cure system based on peroxide/toluidine (acrylic-based monomers) and epoxy polymerization (epoxy based monomer/resins). In one embodiment of the present invention, adhesives of the present invention contain at least one acrylic-based monomer, at least one epoxy based monomer/resin, at least one bi-functional molecule, at least one impact modifier, at least one elastomer and a catalyst system containing at least one reducing agent such as hydroxyethyl toluene, and at least one oxidizing agent such as benzoyl peroxide. In addition, the adhesive optionally may contain at least one cross-linking monomer, and at least one additive, such as a plasticizer or wax.

In another embodiment, adhesives of the present invention contain at least one acrylic-based monomer, at least one epoxy based monomer/resin, at least one bi-functional molecule, at least one impact modifier, at least one elastomer, and a catalyst system containing at least one oxidizing agent such as cumene hydroperoxide, at least one sulfonyl chloride containing compound, and at least one reducing agent such as dihydropyridine. In addition, the adhesive optionally may contain at least one cross-linking monomer, and at least one additive, such as a plasticizer or wax.

Polymerization Catalysts

According to one embodiment of the present invention, a catalyst is used to initiate the polymerization reaction. The term "catalyst," as used herein, describes at least one of the following: (a) a free-radical generator, (b) an initiator, (c) a promoter, (d) an accelerator. In addition, the term catalyst includes oxidizing and reducing agents. Catalysts useful in the present invention may include polymerization catalysts with or without other components that enhance the reactivity of the catalysts. Catalysts useful in the present invention are generally free radical generators that trigger the polymerization of the acrylic monomers. Free-radical generators useful in the present invention, include, but are not limited to, peroxides, hydroperoxides, peresters, peracids, and the like, and mixtures thereof. These catalysts may be activated with radiant energy such as ultraviolet light or heat. Examples of useful catalysts include, but are not limited to, benzoyl peroxide, cumene hydroperoxide, tertiary butyl hydroperoxide, dicumyl peroxide, tertiary butyl peracetate, tertiary butyl perbenzoate, ditertiary butyl azodiisobutylnitrile, and the like, and mixtures thereof. Other examples of catalysts include sulfonyl chloride containing compounds. In one embodiment of the present invention, the catalyst is benzoyl peroxide. In one embodiment of the present invention, the catalyst is sulfonyl chloride, and cumene hydroperoxide.

One embodiment of the present invention uses free-radical-producing catalysts in amounts up to about 20 weight percent based on the weight of the total composition. In another embodiment, catalysts may be used in the range of from about 0.01 to about 10 weight percent based on the weight of the total composition. In another embodiment, catalysts may be used in amounts in the range of from about 0.05 to about 3 weight percent, based on the weight of the total composition.

Other components that may enhance the reactivity of the catalyst include promoters, initiators, and accelerators. Promoters useful in the present invention generally may include an organic salt of a transition metal such as, for example, cobalt-, nickel-, manganese-, or iron-naphthenate, copper-octoate, copper acetyl acetonate, iron hexoate, or iron propionate. Promoters may be added to aid heat induced peroxide decomposition. In one embodiment of the present invention, promoters may be used in amounts of up to about 0.5 weight percent, based on the total weight of the composition. In another embodiment of the present invention, promoters may be used in amounts in the range of from about 1 part per million to about 0.5 weight percent, based on the total weight of the composition.

Initiators useful in the present invention generally are reducing agents. Useful examples of initiators include, but are not limited to, tertiary amines such as N,N-dimethylaniline; N,N-dimethyltoluidine; N,N-diethylaniline; hydroxyethyl toluidine, N,N-diethyltoluidine, and the like, and mixtures thereof Other tertiary amines useful include those described in U.S. Pat. No. 4,112,023, the entirety of which is incorporated herein by reference. In one embodiment of the present invention, initiators may be used in an amount in the range of from about 0.1 to about 3, based on the weight of the adhesive. In another embodiment, initiators may be used in an amount in the range of from about 0.25 to about 2, based on the weight of the adhesive. In another embodiment, initiators may be used in an amount in the range of from about 0.5 to about 1.5, based on the weight of the adhesive.

Other reducing agents useful in the present invention may also include aldehyde-amine condensation products. An example of an aldehyde-amine condensation product is one made from butylaldehyde and a primary amine, such as for example, aniline or butylamine. Condensation products of aliphatic aldehydes with aliphatic or aromatic amines may also be used. An organic substance having one or more sulfonyl chloride moieties may be used to react with these reducing agents. In one embodiment of the present invention, the sulfonyl chloride-containing compound is Hypalon 30. In one embodiment of the present invention, the sulfonyl chloride-containing compound may be used in an amount of up to about 50 weight percent, based on the total weight of the composition. In another embodiment of the present invention, sulfonyl chloride-containing compound may be used in an amount in the range of from about 10 to about 40 weight percent, based on the total weight of the composition. In another embodiment of the present invention, sulfonyl chloride-containing compound may be used in an amount of approximately 25 weight percent, based on the weight of the composition.

In one embodiment of the present invention, the catalyst system contains an oxidizing agent and a reducing agent, wherein the oxidizing agent is selected from the group consisting of peroxides, hydroperoxides, peresters, and per- acids and the like and mixtures thereof, and wherein the reducing agent is selected from the group consisting of amines, and aldehyde-amine condensation products. In another embodiment of the present invention, the catalyst system contains an oxidizing agent and a reducing agent, wherein the oxidizing agent is benzoyl peroxide and wherein the reducing agent is hydroxytoluidine. In another embodiment of the present invention, the catalyst system contains a sulfonyl chloride containing compound, an oxidizing agent, and a reducing agent, wherein the oxidizing agent is selected from the group consisting of peroxides, hydroperoxides, peresters, and peracids and the like and mixtures thereof, and wherein the reducing agent is selected from the group consisting of amines, and aldehyde-amine condensation products. In another embodiment of the present invention, the catalyst system contains a sulfonyl chloride containing compound, an oxidizing agent and a reducing agent, wherein the oxidizing agent is cumene hydroperoxide, and wherein the reducing agent is dihydropyridine.

Sulfonyl chloride containing compounds, such as organic sulfonyl chloride derivatives may be used as the accelerator of the catalyst system. Examples of sulfonyl chloride containing compounds include, but are not limited to, propane sulfonyl chloride and para-toluene sulfonyl chloride. A chlorosulfonated polyethylene polymer useful in the present invention is described in U.S. Pat. Nos. 3,890,407; 4,112,013; and 4,182,644, the entireties of which are herein incorporated by reference. The chlorosulfonated polyethelene polymer of the present invention may contain in the range of from about 25 to about 70 weight percent chlorine and from about 3 to about 160 millimoles of sulfonyl chloride moiety per 100 grams thereof.

In one embodiment of the present invention, a chlorosulfonated polyethylene polymer resin is prepared from branded polyethylene and marketed under the trademark "HYPALON 30" that is commercially available from Du Pont. The HYPALON 30 brand of chlorosulfonated polyethylene polymer resin used contains about 43% by weight chlorine and about 34 millimoles of sulfonyl chloride moiety per 100 grams of polymer resin, and is made from branched polyethylene having a melt index of about 100. Other useful examples of chlorosulfonated polyethylene polymer resins for use in various embodiments of the present invention are described in U.S. Pat. No. 4,536,546, the entirety of which is herein incorporated by reference.

Impact Modifiers

In one embodiment of the present invention, the adhesive includes at least one impact modifier. In one embodiment of the present invention, the impact modifier contains a core-shell graft co-polymer. Core-shell graft copolymer resins useful in the present invention generally have a rubbery core and a hard outer shell, and swell in the adhesive mixture but do not dissolve therein. The adhesives, so formulated, exhibit improved spreading and flow properties that are highly desirable in many adhesive applications. For example, when an adhesive is applied to an article by means of a syringe-type application, many adhesives string out between the point where the applicator was applied and the next position of the applicator. With the present invention, a small drop of adhesive may be applied to the article to be bonded with no adhesive string-out formed. The core or backbone polymer of the graft copolymer has a glass transition temperature substantially below ambient temperature. The shell polymer that is grafted onto the backbone polymer has a glass transition temperature substantially above ambient temperatures.

Examples of useful core-shell graft copolymers are those where hard containing compounds, such as styrene, acrylonitrile or methyl methacrylate, are grafted onto a rubbery core made from polymers of soft or elastomeric containing compounds such as butadiene or ethyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. The core polymer, may optionally contain up to 20 weight percent of other copolymerizable containing compounds, such as styrene, vinyl acetate, methyl methacrylate, butadiene, isoprene, and the like. The core polymer may optionally contain up to 5 weight percent of a cross linking monomer having two or more nonconjugated double bonds of approximately equal reactivity such as ethylene glycol diacrylate, butylene glycol dimethacrylate, and the like. It also optionally may contain up to 5 weight percent of a graft linking monomer having two or more nonconjugated double bonds of unequal reactivity such as, for example, diallyl maleate and allyl methacrylate.

The shell portion may be polymerized from methyl methacrylate and optionally other lower alkyl methacrylates, such as ethyl, butyl, or mixtures thereof. Up to 40 percent by weight of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful impact modifiers include, but are not limited to, Paraloid BTA 753, commercially available from Rohm & Haas Co. and Blendex B983, commercially available from GE Specialty Chemicals. Adhesives of the present invention contain impact modifiers present in an amount sufficient to form adhesives that are impact and heat resistant and have increased adhesive bonding capabilities. In one embodiment of the present invention, impact modifiers are present in an amount in the range of from about 5 to about 35 weight percent, based on the weight of the adhesive. In another embodiment of the present invention, impact modifiers are present in an amount in the range of from about 10 to about 30 weight percent, based on the weight of the adhesive. In another embodiment of the present invention, impact modifiers are present in an amount in the range of from about 15 to about 25 weight percent, based on the weight of the adhesive.

Elastomers

In one embodiment of the present invention, the adhesive contains at least one elastomer. Elastomers useful in this invention are described in detail in the "Handbook of Plastics and Elastomers" pages 1–106–119, (1975) McGraw-Hill, Inc., which is hereby incorporated by reference. Elastomers useful in the present invention have a second order glass transition temperature (Tg) of less than −25° and are soluble in monomers used in the present invention. Useful elastomers include synthetic high polymers that exhibit plastic flow and generally include those that are supplied commercially as adhesive or cement grades.

Examples of elastomers useful in embodiments of the present invention include, but are not limited to, polychloroprene and copolymers of butadiene or isoprene with styrene, acrylonitrile, acrylate esters, methacrylate esters, and the like. Additional examples of useful elastomers include copolymers of ethylene and acrylate esters, homopolymers of epichlorohydrin and copolymers of epichlorohydrin and ethylene.

Examples of elastomeric polymers useful in the present invention may be described using their letter designation according to ASTM D1418, their trade or common name and chemical description. Such examples include CR-Neoprene-polychloroprene; NBR-Nitrile rubber-butadiene acrylonitrile copolymer containing about 25 to 45 weight percent acrylonitrile; COX-Hycar 1072-butadiene-acrylonitrile copolymer modified with carboxylic groups; SBR-GR-S-styrene-butadiene copolymer containing about 10 to about 30 weight percent styrene; ABR-Acrylic rubber acrylate butadiene copolymer; and CO, ECO-Hydrin 100 and 200-homopolymer or a copolymer of epichlorohydrin and ethylene oxide. Other examples include D1116 (Kraton D1116, a styrene-butadiene-styrene block copolymer) and AD-10 and AD-5 (Neoprene AD-10 and AD-5 are polychloroprenes). Additional useful elastomers include elastomers sold commercially under the Vamac trademark by DuPont. These elastomers include copolymers of ethylene and acrylate esters, such as methyl acrylate and ethyl acrylate, wherein the copolymer contains at least 30 weight percent acrylate ester.

In one embodiment of the present invention, elastomers are soluble in the monomers used in the adhesives of this invention. For example, the elastomers may form solutions of from about 10 to about 50 weight percent elastomer in the acrylic-based monomer, such as for example, methyl methacrylate. In another embodiment of the present invention, the elastomer is present in an amount in the range of from about 15 to about 40 weight percent elastomer in the acrylic-based monomer. As used herein the term "solution" is intended to include colloidal dispersion that exhibit normal or substantially Newtonian rheology characteristics.

Adhesives of the present invention may be prepared in two parts wherein one part contains the free radical catalyst (s) and the other part contains an initiator (and a promoter if one is used). Just prior to use, the two parts may be mixed together and applied to at least one of the surfaces to be bonded. Alternatively, the part containing the catalyst may be applied to one surface and the part containing the activator may be applied to the other surface. When contacted, the two parts mix together and polymerization with resultant adhesive bonding takes place.

The following examples are presented to further illustrate the present invention and are not to be construed as limiting the invention.

EXAMPLE 1

TABLE I

Adhesives of the present invention were formulated using techniques known to one skilled in the art as exemplified in U.S. Pat. Nos. 4,959,288 and 5,206,288, the entireties of which are incorporated by reference. As shown in Table I, adhesives of the present invention were formed using a peroxide/toluidine polymerization system. The adhesive side of the adhesive was prepared by mixing together an elastomer, bi-functional molecule, monomer, monomer cross-linker, reducing agent, an additive (wax), and an impact modifier. The elastomer used in the present example was a 52.65 weight percent sample of either 25% Kraton D1116/MMA (SBS block co-polymer) or 25% Neoprene AD-10/MMA (polychloroprene). The bi-functional molecule used, P2M (2-Hydroxyethylmethacrylate phosphoric acid partial ester), contained methacrylate and phosphoric acid functionality on the molecule. The monomer used was MMA (methyl methacrylate). 10 weight percent of a monomer cross-linker, EGDMA (ethylene glycol dimethacrylate) was mixed with the other components. In addition, 1.35 weight percent of reducing agent HET (hydroxyethyltolune), 3 weight percent wax IGI 1230 wax/MMA and 18 weight percent IM B564 (impact modifier) was added to the mixture.

The activator side of the adhesive was prepared by combining an epoxy-based monomer/resin with an oxidizing agent (benzoyl peroxide), an impact modifier, and a plasticizer. The activator portion was then added to the adhesive portion and allowed to cure. Nine adhesives (samples A-I) were prepared and are illustrated in Table I. Each sample was labeled for illustrative purposes with two numbers (numeral+prime (') for the adhesive side and numeral+double prime (") for the activator side). The purpose of this labeling system was to facilitate comparisons of the reactant concentrations in the adhesive and activator sides of the adhesive. For example, Samples A–D, and I all correspond to adhesive 1' and thus have the same concentrations of reactants in the adhesive side of the mixture.

EXAMPLE 1

TABLE II

Example 1 also illustrates properties of adhesives of the present invention, including but not limited to, room temperature curing, improved impact strength, heat resistance and adhesive bonding capabilities. Samples A–I were analyzed for various physical properties, the results of which are contained in Table II. Four different tests were conducted. The first test conducted was a shear adhesion test based on ASTM method D1002. The bond specimens were prepared by mixing the adhesive and activator and placing the mixture on grit blasted, solvent cleaned steel strips along with a few 0.030 inch diameter beads to control the bond thickness. A 1-inch overlap was used. The specimens were cured overnight at room temperature. The results are shown in Table II.

After the bond strengths were tested, each sample was identified according to the "failure mode" it exhibited. Cohesive Failure (CF) represented that a thin layer of adhesive stayed on one surface of the sample and the other surface of the sample had the rest of the cured adhesive. Adhesive Failure (AF) represented that the cured adhesive released from the surface when the bond strength was tested. As shown in Table II, Sample H (no bi-functional molecule) exhibited adhesive failure and much lower bond strength than sample B, which is the same except for the bifunctional monomer. Samples A–G and I exhibited thin layer cohesive failure.

The second test conducted was a cure exothermic test on a 10 g mass of adhesive and activator mixed at the indicated ratio. The adhesive was allowed to cure and the curing was timed in order to determine the time it took for the mixture to reach the maximum exothermic temperature.

The third test conducted was a side impact test (GM9751P). Samples A–G and I exhibited impact strengths in the range of from about 30 to about 60 in-lbs. Combination H with no bi-functional molecule exhibited a low impact strength of approximately 4 in-lbs.

The fourth test conducted was a cleavage test (ASTM3807). Substrates that were difficult to bond were used in this test, namely Budd SMC #971N5 and Cambridge SMC 252. Adhesives of the present invention exhibited strong adhesive bonds when applied to these substrates. The test used the following terms: Maximum Load (lbf) represents the force needed to cause the adhesive bond to start failing. Toughness (psi) is a measure of how much energy is needed to break the entire bond, and generally is the integrated area under the bond strength curve. Propogation (pli) is the amount of force needed to continue pulling the bond apart after the bond begins to break apart. Failure Mode can be Adhesive Failure (AF), Cohesive Failure (CF) or Deep Fiber Tear (DFT), a condition in which the adhesive is stronger than the substrate in which the adhesive was applied.

As shown in Table II, adhesive sample H without the bifunctional molecule exhibited poor results when compared to the adhesives containing the bifunctional molecule (Samples A–G and I).

EXAMPLE 2

TABLE III

As shown in Table III, adhesives of the present invention were formed using a sulfonyl chloride polymerization system. The adhesive side of the adhesive was prepared by mixing together a sulfonyl chloride containing compound, an elastomer, bi-functional molecule, monomer, monomer cross-linker, oxidizing agent, additives (such as a wax and stabilizer), and an impact modifier. The elastomer used in the present example was a 20 weight percent sample of Neoprene AD-10, a polychloroprene (25% AD-10/MMA). Hypalon 30 (H30) was used as the sulfonyl chloride-containing compound (commercially available from DuPont). The bi-functional molecule used was AMPS 2404 (2-acrylamido-2-methyl propanesulfonic acid). BHT (2,6-di-t-butyl-p-cresol) was used as a stabilizer. The monomer used was MMA (methyl methacrylate). 10 weight percent of a monomer cross-linker, EGDMA (ethylene glycol dimethacrylate) was mixed with the other components. In addition, 1 weight percent oxidizing agent CHP (cumene hydroperoxide), 3 weight percent Boler 1977 paraffin wax (30% 1977/MMA), and 15–20 weight percent Paraloid BTA753 (impact modifier) was added to the mixture.

The activator side of the adhesive was prepared by combining an epoxy-based resin (ERL 4221 from Union Carbide Corp.) with a reducing agent (Reillcat™ ASY-2), which is an aldehyde amine condensation product. In addition, the activator side contained a monomer, an impact modifier, and an additive (wax). The activator portion was then mixed with the adhesive portion and allowed to cure. Two samples (Control J and Sample K) were prepared, as illustrated in Table III.

EXAMPLE 2

TABLE IV

The samples of Table III were analyzed for various physical properties, the results of which are contained in Table IV. Control J contained no bifunctional molecule and Sample K contained bifunctional molecule AMPS 2404. Similar tests were conducted as described in Example 1. Sample K exhibited improved adhesive and improved failure mode compared to Sample J on grit blasted steel. As shown in Table IV, Sample K (with AMPS 2404 bifunctional molecule), when tested had higher impact strength than Sample J with no bifunctional molecule.

EXAMPLE 3

TABLE V

This example illustrates the effectiveness of adhesives of the present invention at varying concentrations of bifunctional molecule and epoxy based monomer/resins. As shown in Table V, adhesive samples L–T exhibited good heat resistance and were effective at varying bi-functional molecule and epoxy based monomer/resin concentrations. A GBS bond test was performed on these samples (16 hour@RT, 2 hour at 150° C., 1"×1"0.03") and the results are contained in Table V.

EXAMPLE 4

TABLE VI

This example illustrates the use of impact modifiers in adhesives of the present invention. Adhesives containing an impact modifier and an elastomer (Samples U–W) were prepared in a similar manner as the adhesive samples of Example I. Control Sample X was based on previous technology (U.S. Pat. No. 4,426,243) containing no impact modifier or elastomer. As shown in Table VI, Sample U–W exhibited improved heat and impact resistance over Control X.

EXAMPLE 1 TABLE I

Adhesives based on Peroxide/Toluidine Polymerization System

| | | ADHESIVE | | | | | | | | |
|---|---|---|---|---|---|---|---|---|---|---|
| | Chemical Class | A | B | C | D | E | F | G | H | I |
| ADHESIVE SIDE | Sample comparison No. → | 1' | 1' | 1' | 1' | 2' | 3' | 4' | 5' | 1' |
| 25% Kraton D1116/MMA | Elastomer | 52.65 | 52.65 | 52.65 | 52.65 | 52.65 | 52.65 | 0 | 52.65 | 52.65 |
| 25% Neopene AD-10/MMA | Elastomer | 0 | 0 | 0 | 0 | 0 | 0 | 52.65 | 0 | 0 |
| 2-Hydroxyethylmethacrylate phosphoric acid partial ester | Bi-functional molecule | 5 | 5 | 5 | 5 | 10 | 15 | 5 | 0 | 5 |
| Methyl methacrylate | Monomer | 10 | 10 | 10 | 10 | 5 | 0 | 10 | 15 | 10 |
| Ethylene glylcol dimethacrylate | Monomer Crosslinker | 10 | 10 | 10 | 10 | 10 | 10 | 10 | 10 | 10 |
| Hydroxyethyl toluidine HET | Reducing Agent | 1.35 | 1.35 | 1.35 | 1.35 | 1.35 | 1.35 | 1.35 | 1.35 | 1.35 |
| 30% Paraffin wax/MMA | WAX | 3 | 3 | 3 | 3 | 3 | 3 | 3 | 3 | 3 |
| Kane Ace B-564 | Impact Modifier | 18 | 18 | 18 | 18 | 18 | 18 | 18 | 18 | 18 |
| ACTIVATOR SIDE | Sample comparison No. → | 1" | 2" | 3" | 5" | 4" | 6" | 2" | 2" | 6" |
| Diisobutyl phthalate | Plasticizer | 39.8 | 32.54 | 27.52 | 21.03 | 23.84 | 18.81 | 32.54 | 32.54 | 18.81 |
| Kane Ace B-564 | Impact Modifier | 24.92 | 20.37 | 17.22 | 13.16 | 14.92 | 11.77 | 20.37 | 20.37 | 11.77 |
| ERL 4221 | Epoxy | 22.33 | 36.51 | 46.31 | 58.97 | 53.48 | 63.3 | 36.51 | 36.51 | 63.3 |
| BTW55 | Benzoyl Peroxide Paste | 12.94 | 10.58 | 8.95 | 6.84 | 7.75 | 6.12 | 10.58 | 10.58 | 6.12 |
| ACID:EPOXY GROUP MOLE RATIO | | 1:1 | 1:2 | 1:3 | 1:5 | 1:2 | 1:2 | 1:2 | 0:2 | 1:6 |
| MIX RATIO BY WEIGHT | | | | | | | | | | |
| Adhesive | | 100 | 100 | 100 | 100 | 100 | 100 | 100 | 100 | 100 |
| Activator | | 15.46 | 18.90 | 22.37 | 29.24 | 25.77 | 32.68 | 18.90 | 18.90 | 32.68 |

EXAMPLE 1 TABLE II

Properties of samples A–I (Table I)

| | ADHESIVE | | | | | | | | |
|---|---|---|---|---|---|---|---|---|---|
| | A | B | C | D | E | F | G | H | I |
| GRIT BLASTED STEEL BONDS-PSI 72° F. OVERNIGHT CURE | 1,845 | 1,803 | 1,695 | 1,324 | 1,731 | 1,792 | 1,797 | 1,396 | N.R. |
| FAILURE MODE | THIN CF[1] | THIN CF[1] | THIN CF[1] | THIN CF[1] | V. THIN CF[1] | V. THIN CF[1] | THIN CF[1] | AF[1] | |
| TIME TO MAX. EXO | 90 MINS | 68 MINS | 63 MINS | 58 MINS | 31 MINS | 13 MINS | 54 MINS | 17 MINS | 59 MINS |
| TEMP OF MAX. EXO | 246° F. | 232° F. | 217° F. | 205° F. | 236° F. | 255° F. | 235° F. | 242° F. | 199° F. |
| IMPACT STRENGTH[3] | 61.020 in.-lbs. | 47.234 in.-lbs. | 52.216 in.-lbs. | 47.018 in.-lbs. | 39.776 in.-lbs. | 30.284 in.-lbs. | 53.788 in.-lbs. | 4.068 in.-lbs. | 43.618 in.-lbs. |
| FAILURE MODE | CF[1]/RED BROWN | CF[1]/WHITE | CF[1]/WHITE | CF[1]/WHITE | CF[1]/WHITE | CF[1]/WHITE | CF[1]/WHITE | CF[1]/WHITE | CF[1]/WHITE |
| BUDD #971N5 | | | | | | | | | |
| MAX LOAD (lbf) | | 19.276 | | | | | | 1.772 | |
| TOUGHNESS (psi) | | 6.043 | | | | | | 0.154 | |
| PROPO-GATION (pli) | | 5–8 | | | | | | 0.6–1.4 | |
| FAILURE MODE | | 100% DFT[4] | | | | | | 100% AF[2] | |
| CAMBRIDGE 252 | | | | | | | | | |
| MAX. LOAD (lbf) | | 22.8 | | | | | | 9.862 | |
| TOUGHNESS (psi) | | 1.277 | | | | | | 0.353 | |

EXAMPLE 1 TABLE II-continued

Properties of samples A–I (Table I)

| | ADHESIVE | | | | | | | | |
|---|---|---|---|---|---|---|---|---|---|
| | A | B | C | D | E | F | G | H | I |
| PROPAGATION | | 5–12 | | | | | | 0 | |
| FAILURE MODE | | 100% AF[2] | | | | | | 100% AF[2] | |

[1]COHESIVE FAILURE
[2]ADHESIVE FAILURE
[3]OVERNIGHT @ 72° F., 4 hours @ 300° F., overnight @ 72° F.
[4]DEEP FIBER TEAR

EXAMPLE 2 TABLE III

Adhesives based on 1:1 sulfonyl chloride curing system

| | | ADHESIVE | |
|---|---|---|---|
| | CHEMICAL CLASS | J CONTROL | K - 15.96% 2404 |
| ADHESIVE SIDE | | | |
| 25% Neopene AD-10/MMA | Elastomer | 20 | 20 |
| 40% Hapalon H30/MMA | Sulfonyl chloride | 25 | 25 |
| AMPS 2404 2-acrylamido-2-methyl propanesulfonic acid | Bifunctional molecule | 0 | 15.96 |
| BHT 2,6-Di-t-Butyl-p-Cresol | Stabilizer | 1 | 1 |
| CHP Cumene Hydroperoxide | Oxidizing Agent | 1 | 1 |
| Paraloid BTA 753 | Impact modifier | 20 | 20 |
| MMA (Methyl methacrylate) | Monomer | 20 | 9.04 |
| 30% Boler 1977/MMA | Wax | 3 | 3 |
| EGDMA Ethylene glycol dimethacrylate | Monomer Cross Linker | 10 | 10 |
| ACTIVATOR SIDE | | | |
| 25% Neopene AD-10/MMA | Elastomer | 20 | 20 |
| Paraloid BTA 753 | Impact Modifier | 22 | 22 |
| Reillcat Asy2 | Di Hydropyridine | 2 | 2 |
| ERL 4221 | Epoxy | 16.03 | 16.03 |
| MMA (Methyl methacrylate) | Monomer | 36.97 | 36.97 |
| 30% 1977/MMA | Wax | 3 | 3 |
| Acid:Epoxy group mole ratio | | | 1:2 |

EXAMPLE 2 TABLE IV

Properties of Control J, Sample K of Table III

| | ADHESIVE | |
|---|---|---|
| | CONTROL J | SAMPLE K |
| CURE EXOTHERM | | |
| TIME TO MAX. EXO. | 50.15 MINS | 63.00 MINS |
| TEMP OF MAX. EXO | 261° F. | 239° F. |
| GBS BONDS | 1684 psi | 2030 psi |
| | 100% AF[3] | 55% AF/45% CF |
| SIDE IMPACTS | 32.91 in.-lbs. | 2 @ 92.095 in.-lbs. 100% AF[3] |
| | 100% AF[3] | 2 @ >113 in.-lbs. Substrate Deformation bond did not break. |

[1]COHESIVE FAILURE
[2]OVERNIGHT @ 72° F., 4 HOURS @ 300° F., OVERNIGHT @ 72° F. AGAIN
[3]ADHESIVE FAILURE

EXAMPLE 3 TABLE V

Adhesives using toluidine/peroxide polymerization system at varying concentrations of bi-functional molecule and varying concentration of epoxy.

| | | ADHESIVE | | | | | | | | |
|---|---|---|---|---|---|---|---|---|---|---|
| | Chemical Class | L | M | N | O | P | Q | R | S | T |
| ADHESIVE SIDE | | | | | | | | | | |
| Kraton D1116 | Elastomer | 13.34 | 13.34 | 13.34 | 13.34 | 13.34 | 13.34 | 13.34 | 13.34 | 13.34 |
| Paraloid BTA 753 | Impact modifier | 18 | 18 | 18 | 18 | 18 | 18 | 18 | 18 | 18 |

EXAMPLE 3 TABLE V-continued

Adhesives using toluidine/peroxide polymerization system at varying concentrations of bi-functional molecule and varying concentration of epoxy.

| | | ADHESIVE | | | | | | | | |
|---|---|---|---|---|---|---|---|---|---|---|
| | Chemical Class | L | M | N | O | P | Q | R | S | T |
| AMPS 2404 | Bifunctional monomer | 5 | 5 | 5 | 10 | 10 | 10 | 15 | 15 | 15 |
| methyl methacrylate | Monomer | 52.16 | 52.16 | 52.16 | 47.16 | 47.16 | 47.16 | 42.16 | 42.16 | 42.16 |
| EGDMA ethylene glycol dimethacrylate | Monomer crosslinker | 10 | 10 | 10 | 10 | 10 | 10 | 10 | 10 | 10 |
| HET (hydroxy-ethylfoluidine) | Reducing agent | 0.5 | 0.5 | 0.5 | 0.5 | 0.5 | 0.5 | 0.5 | 0.5 | 0.5 |
| paraffin wax | Wax | 1 | 1 | 1 | 1 | 1 | 1 | 1 | 1 | 1 |
| Total | | 100 | 100 | 100 | 100 | 100 | 100 | 100 | 100 | 100 |
| ACTIVATOR SIDE | | | | | | | | | | |
| ERL4221 | Epoxy | 2 | 2.5 | 3 | 4 | 5 | 6 | 6 | 7.5 | 9 |
| 61.5% diisobutyl phthalate/38.5% Paraloid BTA753 | plasticizer/impact modifier | 10 | 10 | 10 | 10 | 10 | 10 | 10 | 10 | 10 |
| BTW55 | benzoyl peroxide paste | 2 | 2 | 2 | 2 | 2 | 2 | 2 | 2 | 2 |
| Mix Ratio by Weight | | | | | | | | | | |
| Adhesive | | 100 | 100 | 100 | 100 | 100 | 100 | 100 | 100 | 100 |
| Activator | | 14 | 14.5 | 15 | 16 | 17 | 18 | 18 | 19.5 | 21 |
| GBS Shear Adhesion Test | | | | | | | | | | |
| 16 hr @ RT. 2 hr @ 150 C. 1" × 1" × .03" | | | | | | | | | | |
| GBS (grit blasted steel bonds) | | 1086 psi | 1065 psi | 1104 psi | 1178 psi | 1077 psi | 1272 psi | 1117 psi | 1102 psi | 1177 psi |
| Acid:Epoxy group mole ratio | | 1:0.8 | 1:1.0 | 1:1.2 | 1:0.8 | 1:1.0 | 1:1.2 | 1:0.8 | 1:10 | 1:1.2 |

EXAMPLE 4, TABLE VI

Adhesives W–Y compared to adhesives that do not contain impact modifier

| | | ADHESIVES | | | |
|---|---|---|---|---|---|
| | CHEMICAL CLASS | U | V | W | X |
| ADHESIVE SIDE | | | | | |
| Kraton D1116 | Elastomer | 11.97 | 11.97 | 11.97 | |
| MMA (Methyl methacrylate) | Monomer | 46.71 | 46.71 | 46.71 | |
| EGDMA (ethylene glycol dimethacrylate) | Monomer crosslinker | 8.95 | 8.95 | 8.95 | |
| HET (hydroxyethyltoluidine) | Reducing agent | 0.45 | 0.45 | 0.45 | |
| Boler 1977 wax | Wax | 0.81 | 0.81 | 0.81 | |
| Paraloid BTA 753 | Impact modifier | 16.11 | 16.11 | 16.11 | |
| 2-Hydroxyethylmethacrylate phosphoric acid partial ester | bifunctional monomer | 15 | 15 | 15 | |
| Ethoxylated Bisphenol A Dimethacrylate | Monomer crosslinker | | | | 34.55 |
| Epon 828 | Epoxy | | | | 34.55 |
| Glycidyl methacrylate | bifunctional monomer | | | | 9.87 |
| MAA (Methacrlyic acid) | bifunctional monomer | | | | 14.18 |
| SR350 (Trimethylolpropane Trimethacrylate) | Monomer crosslinker | | | | 4.94 |

EXAMPLE 4, TABLE VI-continued

Adhesives W–Y compared to adhesives that do not contain impact modifier

|  |  | ADHESIVES | | | |
|---|---|---|---|---|---|
|  | CHEMICAL CLASS | U | V | W | X |
| CHP (Cumene hydroperoxide) | Oxidizing agent |  |  |  | 0.99 |
| Diphenyletherdisulfonyl chloride | Catalyst |  |  |  | 0.3 |
| ACTIVATOR SIDE |  |  |  |  |  |
| 61.5% diisobutyl phthalate/38.5% Paraloid BTA 753 | plasticizer/impact modifier | 10 | 10 | 10 |  |
| BTW55 | benzoyl peroxide paste | 2 | 2 | 2 |  |
| Erisys GE-60 | Epoxy | 12.75 | 25.5 | 38.25 |  |
| Reillcat Asy2 | Reducing agent |  |  |  | 100% |
| Mix Ratio by Weight |  |  |  |  |  |
| Adhesive/activator |  | 100/24.75 | 100/37.5 | 100/50.25 | Activator applied to metal surface. |
| Side Impact (in. ib/in$^2$)$^3$ |  | >113$^1$ | >113$^1$ | >113$^1$ | 14.1$^2$ |

[1] Grit blasted steel 1" × 1" A, B, C bonds had .03 inch diameter beads for bond thickness. All gave substrate deformation; no bonds failed.
[2] The viscosity of D was too low so no beads were used.
[3] All bonds cured 16 hr room temperature and 24 hr 300 F.

What is claimed is:

1. A heat and impact resistant adhesive comprising:
   at least one acrylic-based monomer,
   at least one epoxy based monomer;
   at least one monomer chemically reactive with the acrylic-based monomer and the epoxy based monomer;
   at least one impact modifier,
   at least one elastomer, and
   a catalyst system.

2. The adhesive of claim 1, wherein the catalyst system contains an oxidizing agent and a reducing agent, wherein the oxidizing agent is selected from the group consisting of peroxides, hydroperoxides, peresters, and peracids and the like and mixtures thereof, and wherein the reducing agent is selected from the group consisting of amines, aldehyde-amine condensation products, anilines, toludines and the like and mixtures thereof.

3. The adhesive of claim 1, wherein the catalyst system contains an oxidizing agent and a reducing agent, wherein the oxidizing agent is benzoyl peroxide and wherein the reducing agent is hydroxyethyl toluidine.

4. The adhesive of claim 1, wherein the catalyst system is a heat-activated catalyst.

5. The adhesive of claim 1, wherein the system contains a sulfonyl chloride-containing compound, an oxidizing agent, and a reducing agent, wherein the oxidizing agent is selected from the group consisting of peroxides, hydroperoxides, peresters, and peracids and the like and mixtures thereof, and wherein the reducing agent is selected from the group consisting of amines, aldehyde-amine condensation products, anilines, toludines and the like and mixtures thereof.

6. The adhesive of claim 1, wherein the system contains a sulfonyl chloride containing compound, an oxidizing agent and a reducing agent, wherein the oxidizing agent is cumene hydroperoxide, and wherein the reducing agent is a dihydropyridine.

7. The adhesive of claim 1, wherein the acrylic-based monomer is methyl methacrylate.

8. The adhesive of claim 1, wherein the epoxy based monomer is a diglycidyl ether of bisphenol.

9. The adhesive of claim 1, wherein the monomer chemically reactive with the acrylic-based monomer and the epoxy based monomer is selected from the group consisting of glycidyl methacrylate, methacrylic acid, 2-Hydroxyethylmethacrylate phosphoric acid partial ester, and 2-acrylamido-2 methyl propanesulfonic acid, and the like and mixtures thereof.

10. The adhesive of claim 1, wherein the monomer chemically reactive with the acrylic-based monomer and the epoxy based monomer is methacrylic acid.

11. The adhesive of claim 1, wherein the monomer chemically reactive with the acrylic-based monomer and the epoxy based monomer is 2-Hydroxyethylmethacrylate phosphoric acid partial ester.

12. The adhesive of claim 1, wherein the impact modifier is a core-shell graft copolymer selected from the group consisting of ABS, MBS, MABS, ASA, all-acrylic, SA EPDM, and MAS.

13. The adhesive of claim 1, wherein the elastomer has a second order glass transition temperature (Tg) of less than −25° C. and are soluble in acrylic-based monomers.

14. The adhesive of claim 1, wherein the adhesive has a post cured adhesive side impact strength in the range of from about 8 in.-lbs to about 113 in.-lbs.

15. The adhesive of claim 1, wherein the adhesive has a post cured adhesive side impact strength greater than about 113 in.-lbs.

16. The adhesive of claim 1, wherein the monomer chemically reactive with the acrylic-based monomer and the epoxy based monomer is present in the range up to about 2 weight percent, based on the weight of the adhesive, and the adhesive has a mole ratio of about 1 part monomer chemically reactive with the acrylic-based monomer and the epoxy based monomer to about 1 or 4 greater part epoxy monomer.

17. The adhesive of claim 1, wherein the monomer chemically reactive with the acrylic-based monomer and the epoxy based monomer is present in the range of greater than about 2 weight percent, based on the weight of the adhesive, and the adhesive has a mole ratio of about 1 part monomer chemically reactive with the acrylic-based monomer and the epoxy based monomer to about 0.3 or greater part epoxy monomer.

18. A method for making an adhesive comprising the steps of:
mixing at least one acrylic-based monomer, at least one epoxy based monomer, at least one monomer reactable with the acrylic-based monomer and the epoxy based monomer, at least one impact modifier, at least one elastomer a catalyst system and an activator;
applying the mixture to a first surface or a second surface, and contacting the first surface with the second surface.

19. A method for bonding two surfaces comprising the steps of:
(a) mixing at least one acrylic-based monomer, at least one epoxy based monomer, at least one monomer reactable with the acrylic-based monomer and the epoxy based monomer, at least one impact modifier, at least one elastomer, and a catalyst system to form a mixture;
(b) applying the mixture to a first surface;
(c) applying an activator to a second surface; and
(d) contacting the first surface with the second surface.

20. A heat and impact resistant adhesive comprising:
at least one acrylic-based monomer;
at least one epoxy based monomer/resn;
at least one bifunctional monomer chemically reactive with the acrylic-based monomer and the epoxy based monomer resin;
at least one impact modifier; and a catalyst system, wherein the catalyst system contains a sulfonyl chloride containing compound, an oxidizing agent and a reducing agent, wherein the oxidizing agent is cumene hydroperoxide, and wherein the reducing agent is a dihyrdopyridine.

21. A heat and impact resistant adhesive comprising:
at least one acrylic-based monomer;
at least one epoxy based monomer/resn;
at least one bifunctional monomer chemically reactive with the acrylic-based monomer and the epoxy based monomer/resin;
at least one impact modifier;
at least one elastomer,
and a catalyst system.

22. A heat and impact resistant adhesive comprising:
at least one acrylic-based monomer;
at least one epoxy based monomer/resin;
at least one bifunctional monomer chemically reactive with the acrylic-based monomer and the epoxy based monomer/resin;
at least one impact modifier;
and a catalyst system, wherein the catalyst system contains an oxidizing agent and a reducing agent, wherein the oxidizing agent is benzoyl peroxide and wherein the reducing agent is hydroxyethyl toluidine.

23. A heat and impact resistant adhesive comprising:
at least one acrylic-based monomer;
at least one epoxy based monomer/resin;
at least one bifunctional monomer chemically reactive with the acrylic-based monomer and the epoxy based monomer/resin;
at least one impact modifier;
and a catalyst system, wherein the system contains a sulfonyl chloride-containing compound, an oxidizing agent, and a reducing agent, wherein the oxidizing agent is selected from the group consisting of peroxides, hydroperoxides, peresters, and peracids and the like and mixtures thereof, and wherein the reducing agent is selected from the group consisting of amines, aldehyde-amine condensation products, anilines, toludines and the like and mixtures thereof.

24. A heat and impact resistant adhesive comprising:
at least one acrylic-based monomer;
at least one epoxy based monomer/resin;
at least one bifunctional monomer chemically reactive with the acrylic-based monomer and the epoxy based monomer/resin, wherein at least one of the bifunctional monomer(s) is 2-Hydroxyethylmethacrylate phosphoric acid partial ester;
at least one impact modifier,
and a catalyst system.

* * * * *